(12) United States Patent
Peng et al.

(10) Patent No.: US 11,780,578 B2
(45) Date of Patent: Oct. 10, 2023

(54) CONTROL CHANNEL ALLOCATION METHOD, TAKE-OFF METHOD AND REMOTE CONTROL METHOD FOR FLIGHT APPARATUS

(71) Applicant: CAINIAO SMART LOGISTICS HOLDING LIMITED, Grand Cayman (KY)

(72) Inventors: Anzhai Peng, Hangzhou (CN); Yong Wang, Hangzhou (CN); Shaohua Chen, Hangzhou (CN); Yang Gao, Hangzhou (CN)

(73) Assignee: CAINIAO SMART LOGISTICS HOLDING LIMITED, Grand Cayman (KY)

( * ) Notice: Subject to any disclaimer, the term of this patent is extended or adjusted under 35 U.S.C. 154(b) by 858 days.

(21) Appl. No.: 16/788,075

(22) Filed: Feb. 11, 2020

(65) Prior Publication Data
US 2020/0172242 A1 Jun. 4, 2020

Related U.S. Application Data

(63) Continuation of application No. PCT/CN2018/098972, filed on Aug. 6, 2018.

(30) Foreign Application Priority Data

Aug. 16, 2017 (CN) .......................... 201710702657.6

(51) Int. Cl.
*B64C 39/02* (2023.01)
*G05D 1/06* (2006.01)
*G08G 5/00* (2006.01)

(52) U.S. Cl.
CPC ......... *B64C 39/024* (2013.01); *G05D 1/0653* (2013.01); *G08G 5/003* (2013.01); *G08G 5/0069* (2013.01); *B64U 2201/20* (2023.01)

(58) Field of Classification Search
CPC ............ B64C 39/024; B64C 2201/146; G05D 1/0653; G08G 5/003; G08G 5/0069
See application file for complete search history.

(56) References Cited

U.S. PATENT DOCUMENTS

| 9,412,280 B1 | 8/2016 | Zwillinger et al. |
| 10,290,218 B2 * | 5/2019 | Nostry .................. G08G 5/025 |

(Continued)

FOREIGN PATENT DOCUMENTS

| CN | 205121346 U | 3/2016 |
| CN | 105487553 A | 4/2016 |

(Continued)

OTHER PUBLICATIONS

Yang, Fully Distributed Channel-Hopping Algorithms for Rendez-vous Setup in Cognitive Multiradio Networks, 2016, IEEE Transactions on Vehicular Technology, vol. 65, No. 10, 8629-8643 (Year: 2016).*

(Continued)

*Primary Examiner* — Elaine Gort
*Assistant Examiner* — Anthony M Gartrelle (57) ABSTRACT

A control channel allocation method for a flying device comprises: allocating a task to a flying device, wherein the task comprises flight information for the flying device; determining a flight time of the flying device flying from a departure station to an arrival station according to the flight information; searching for one or more control channels at the departure station and the arrival station that are idle during the flight time based on one or more control channel occupation tables as one or more target control channels, wherein the one or more control channel occupation tables store idle states of a plurality of control channels at the departure station and the arrival station during a plurality of periods of time; and allocating the one or more target control (Continued)

channels for controlling the flying device to fly from the departure station to the arrival station.

17 Claims, 5 Drawing Sheets

(56) References Cited

U.S. PATENT DOCUMENTS

| | | | |
|---|---|---|---|
| 2013/0289858 A1 | 10/2013 | Mangiat et al. | |
| 2014/0061377 A1 | 3/2014 | Smith | |
| 2014/0277854 A1 | 9/2014 | Jones | |
| 2015/0304885 A1* | 10/2015 | Jalali | H04B 7/18504 370/329 |
| 2016/0042637 A1 | 2/2016 | Cahill | |
| 2016/0059963 A1 | 3/2016 | Burgess et al. | |
| 2016/0094965 A1 | 3/2016 | Sennett et al. | |
| 2016/0107750 A1 | 4/2016 | Yates | |
| 2016/0253907 A1 | 9/2016 | Taveira | |
| 2016/0332851 A1 | 11/2016 | Bialkowski et al. | |
| 2017/0011339 A1 | 1/2017 | Buford | |
| 2017/0011340 A1 | 1/2017 | Gabbai | |
| 2017/0215178 A1* | 7/2017 | Kim | H04W 72/51 |
| 2017/0372259 A1 | 12/2017 | Lesser et al. | |
| 2019/0202562 A1 | 7/2019 | Sopper et al. | |

FOREIGN PATENT DOCUMENTS

| | | |
|---|---|---|
| CN | 205265924 U | 5/2016 |
| CN | 105807788 A | 7/2016 |
| CN | 105892486 A | 8/2016 |
| CN | 105898741 A | 8/2016 |
| CN | 105939533 A | 9/2016 |
| CN | 205787905 U | 12/2016 |
| CN | 106412046 A | 2/2017 |
| CN | 106814749 A | 6/2017 |
| CN | 106919183 A | 7/2017 |
| WO | 2018/094578 A1 | 5/2018 |

OTHER PUBLICATIONS

Hengtai Chang, a 3D Non-Stationary Wideband GBSM for Low-Altitude UAV-to-Ground V2V Mimo Channels, 2019, IEEE, vol. 7, 70719-70732 (Year: 2019).*
Lilling Ren, Air Traffic Management (ATM) Operations: A Review, 2017, ResearchGate, GE Global Research, 1-106 (Year: 2017).*
Wahab Khawaja, UWB Channel Sounding and Modeling for UAV Air-to-Ground Propagation Channels, 2016, IEEE, 1-7 (Year: 2016).*
PCT International Search Report and the Written Opinion dated Nov. 7, 2018, issued in related International Application No. PCT/CN2018/098972, with partial English translation (10 pages).
PCT International Preliminary Report on Patentability dated Feb. 27, 2020, issued in related International Application No. PCT/CN2018/098972, with English translation (10 pages).
First Search dated Sep. 27, 2020, issued in related Chinese Application No. 201710702657.6 (1 page).
First Office Action dated Oct. 10, 2020, issued in related Chinese Application No. 201710702657.6, with English machine translation (10 pages).
Extended European Search Report dated Feb. 25, 2021, issued in related European Application No. 18846021.6 (9 pages).
Supplementary Search dated Apr. 25, 2021, issued in related Chinese Application No. 201710702657.6 (2 pages).
Second Office Action dated May 7, 2021, issued in related Chinese Application No. 201710702657.6, with English machine translation (12 pages).
Supplementary Search dated Sep. 10, 2021, issued in related Chinese Application No. 201710702657.6 (1 page).
Third Office Action dated Sep. 16, 2021, issued in related Chinese Application No. 201710702657.6, with English machine translation (16 pages).
Examination Report dated Oct. 7, 2021, issued in related European Application No. 18846021.6 (6 pages).

* cited by examiner

CONTROL CHANNEL ALLOCATION METHOD, TAKE-OFF METHOD AND REMOTE CONTROL METHOD FOR FLIGHT APPARATUS

CROSS-REFERENCE TO RELATED APPLICATIONS

The present application is a continuation application of International Patent Application No. PCT/CN2018/098972, filed on Aug. 6, 2018, which is based on and claims priority to the Chinese Patent Application No. 201710702657.6, filed on Aug. 16, 2017 and entitled "Control Channel Allocation Method, Take-Off Method and Remote Control Method for Flight Apparatus." The above-referenced applications are incorporated herein by reference in their entirety.

TECHNICAL FIELD

The application relates to the field of flight remote control technologies, and in particular, to a control channel allocation method, a take-off method, a take-off remote control method and a landing remote control method for a flying device, as well as a flight management server, a flying device, a take-off remote control device, and a landing remote control device.

BACKGROUND

As the Internet has become increasingly popular nowadays, almost all users are shopping online. Accordingly, the logistics industry is experiencing an increasingly fast development. As the logistics industry becomes popular, flying devices, such as unmanned aerial vehicles, are used more commonly to transport packages. Taking logistics based on unmanned aerial vehicles as an example, cargo transport by unmanned aerial vehicles is typically divided into three phases: loading and taking off, flight on a route, and terminal cargo delivery, i.e., the landing of unmanned aerial vehicles. By flight transportation of logistic packages among various logistics stations, a series of practical problems, such as poor road conditions or congested roads, may be solved.

However, interference factors, such as pedestrians, power cables, houses and the like, may appear in the landing and take-off phases of an unmanned aerial vehicle due to its relatively low flight altitude, which are phases with high risks. Therefore, a backup remote control device is often used in these phases to perform one-to-one assisted control on the unmanned aerial vehicle, i.e., the remote control device is in a backup and waiting state without performing actual control on the unmanned aerial vehicle. When an emergency occurs, can the remote control device switch into an active control state to prevent the unmanned aerial vehicle from causing an accident through experience and operations of a controlling user.

All remote control devices and unmanned aerial vehicles are configured in a paired manner, while unmanned aerial vehicles move frequently among logistics stations. If every unmanned aerial vehicle is provided with a dedicated remote control device at every logistics station, the cost is relatively high; additionally, it is difficult to differentiate many remote control devices at the same logistics station. If the remote control devices are used in a chaotic manner, the goal of manually and accurately interfering with unmanned aerial vehicles cannot be achieved, and more severe accidents may even be caused.

SUMMARY

In light of this, the application provides a control channel allocation method for a flying device, for pre-dividing 2.4G wireless frequency band into 80 control channels, such that all unmanned aerial vehicles and remote control devices at the same logistics station share all the control channels. As a result, one remote control device can be used to respectively control a plurality of unmanned aerial vehicles at each logistics station, i.e., there is no one-to-one control between an unmanned aerial vehicle and a remote control device; at the same time, some embodiments of the application can also ensure that, when a plurality of unmanned aerial vehicles take off or land at the same time, the remote control device may control one of the unmanned aerial vehicles based on needs and can rapidly switch among a plurality of control channels corresponding to the plurality of unmanned aerial vehicles, thereby improving the frequency spectrum utilization efficiency of the remote control device and reducing reception interference among the unmanned aerial vehicles. In addition, the application may further provide a remote control signal indicator on an unmanned aerial vehicle to help an operating user determine whether the unmanned aerial vehicle that is to be controlled is connected.

The application further provides a flight management server, a flying device, and take-off and landing remote control devices to ensure the implementation and application of the above method in practice.

To solve the above problem, the application provides a control channel allocation method for a flying device. The method comprises: allocating a task to a flying device, wherein the task comprises flight information for the flying device; determining a flight time of the flying device flying from a departure station to an arrival station according to the flight information; searching for one or more control channels at the departure station and the arrival station that are idle during the flight time based on one or more control channel occupation tables as one or more target control channels, wherein the one or more control channel occupation tables store idle states of a plurality of control channels at the departure station and the arrival station during a plurality of periods of time; and allocating the one or more target control channels for controlling the flying device to fly from the departure station to the arrival station.

In some embodiments, the flight time comprises an entire time of the flying device flying from a departure station to an arrival station, a take-off time of the flying device flying from a departure station to an arrival station, or a landing time of the flying device flying from a departure station to an arrival station.

In some embodiments, searching for one or more control channels at the departure station and the arrival station that are idle during the flight time based on one or more control channel occupation tables as one or more target control channels comprises: selecting, from the one or more control channels, a channel having the longest distance from all channels in use as a target channel for controlling the flying device at the departure station and the arrival station, the channels in use each having a non-idle state at the departure station or the arrival station during the flight time.

In some embodiments, a plurality of control channels respectively correspond to a plurality of channel identifiers; and wherein selecting, from the one or more control channels, a channel having the longest distance from a channel in use as a target channel for controlling the flying device at the departure station and the arrival station comprises: respectively calculating an absolute value of a difference between channel identifiers of each of the one or more control channels and each channel in use; and determining a control channel corresponding to a difference having a maximum absolute value as the target channel for controlling the flying device.

In some embodiments, searching for one or more control channels at the departure station and the arrival station that are idle during the flight time based on one or more control channel occupation tables as one or more target control channels comprises: querying the one or more control channels that are idle during the flight time in the one or more control channel occupation tables for the departure station and the arrival station respectively as the one or more target channels.

In some embodiments, the method further comprises: determining whether the one or more control channels at the departure station and the arrival station that are idle during the flight time have been successfully queried; in response to determining that the one or more control channels at the departure station and the arrival station that are idle during the flight time have been successfully queried, executing selecting, from the one or more control channels, a channel having the longest distance from a channel in use as a target channel for controlling the flying device at the departure station and the arrival station; and in response to determining that no control channel that is idle at the departure station and the arrival station during the flight time has been successfully queried, querying an idle control channel in a control channel occupation table corresponding to the departure station as a departure station channel for controlling the flying device at the departure station, and querying an idle control channel in a control channel occupation table corresponding to the arrival station as an arrival station channel for controlling the flying device at the arrival station.

In some embodiments, the method further comprises: notifying the flying device of the departure station channel and the arrival station channel; and sending a channel enabling request for the departure station channel to a remote control device of the departure station.

In some embodiments, the method further comprises: monitoring, after the flying device takes off, a real-time flight position of the flying device; determining whether the real-time flight position of the flying device meets a channel switching condition; and in response to determining that the real-time flight position of the flying device meets a preset channel switching condition, sending a channel enabling request for the arrival station channel to a remote control device of the arrival station.

In some embodiments, the channel switching condition indicates that the flying device is about to land at the arrival station.

In some embodiments, the method further comprises: sending to the remote control device of the departure station a channel releasing request for the departure station channel, causing the remote control device to release channel resources occupied by the departure station channel.

Some embodiments of the application further disclose a flight management server. The flight management server comprises: one or more processors and one or more non-transitory computer-readable memories coupled to the one or more processors and configured with instructions executable by the one or more processors to cause the server to perform operations comprising: allocating a task to a flying device, wherein the task comprises flight information for the flying device; determining a flight time of the flying device flying from a departure station to an arrival station according to the flight information; searching for one or more control channels at the departure station and the arrival station that are idle during the flight time based on one or more control channel occupation tables as one or more target control channels, wherein the one or more control channel occupation tables store idle states of a plurality of control channels at the departure station and the arrival station during a plurality of periods of time; and allocating the one or more target control channels for controlling the flying device to fly from the departure station to the arrival station.

Some embodiments of the application further disclose a non-transitory computer-readable storage medium configured with instructions executable by one or more processors to cause the one or more processors to perform operations comprising: allocating a task to a flying device, wherein the task comprises flight information for the flying device; determining a flight time of the flying device flying from a departure station to an arrival station according to the flight information; searching for one or more control channels at the departure station and the arrival station that are idle during the flight time based on one or more control channel occupation tables as one or more target control channels, wherein the one or more control channel occupation tables store idle states of a plurality of control channels at the departure station and the arrival station during a plurality of periods of time; and allocating the one or more target control channels for controlling the flying device to fly from the departure station to the arrival station.

Embodiments of the application have the following advantages. In some embodiments, a flight management server is used to manage, in a unified manner, a plurality of control channels that are divided in advance. Each control channel comprises: communication sub-channels and a frequency-hopping map cyclically set according to a preset channel interval. After allocating a received task to a corresponding flying device, the flight management server calculates a flight time of the flying device flying from the departure station to the arrival station, allocates a control channel that is idle at both the departure station and the arrival station during the flight time to the flying device for performing auxiliary control on the flying device during take-off or landing. In this way, there is no need to perform one-to-one bundling control between remote control device devices and flying devices. If auxiliary control is required by a flying device during take-off or landing, a take-off remote control device and a landing remote control device may be used to control the flying device during the take-off and landing, respectively, using a control channel pre-allocated by the flight management server. After the control is completed, channel resources of this control channel can be released.

Any product implementing any embodiment of the application may not be required to simultaneously achieve all the above-described advantages.

BRIEF DESCRIPTION OF THE DRAWINGS

To more clearly describe the embodiments of the application, the accompanying drawings to be used in the following description of the embodiments will be briefly described. The accompanying drawings in the description merely illustrate some embodiments of the application. One of ordinary skill in the art may obtain other drawings according to the accompanying drawings without creative effort.

DETAILED DESCRIPTION OF THE INVENTION

The embodiments of the application will be clearly and completely described below with reference to the accompanying drawings in some embodiments of the application. The described embodiments are merely some, but not all, embodiments of the application. Based on some embodiments of the application, all other embodiments obtained by one of ordinary skill in the art without creative effort shall fall within the protection scope of the application.

In some embodiments, the 2.4 G wireless frequency band may be divided in advance. The 2.4 G wireless frequency band refers to a frequency band with frequencies between 2.405 GHz and 2.485 GHz (for applications of science, medicine, and agriculture). In some embodiments, 2.400 GHz to 2.480 GHz of the 2.4 G wireless resource frequency band may be first divided into 80 communication sub-channels with each channel having a width of 1 M. Moreover, a frequency-hopping map is cyclically set according to a 22 M interval. In some embodiments, such a 1 M frequency point and its corresponding frequency-hopping map thereof are used as one control channel. Then, a total of 80 control channels are obtained. The control channels are separated from one another and a frequency-hopping gain can be obtained. As a result, one control channel may comprise two parts: a start frequency point and a frequency-hopping pattern, while the 80 control channels are numbered from 1 to 80 (i.e., control channel identifiers) according to an order of the start frequency points. The division mode of these 80 control channels may be fixed in a flight management server, a flying device (e.g., an unmanned aerial vehicle and the like), and a remote control device in advance. One unique control channel may be obtained according to a number.

Figure 1:
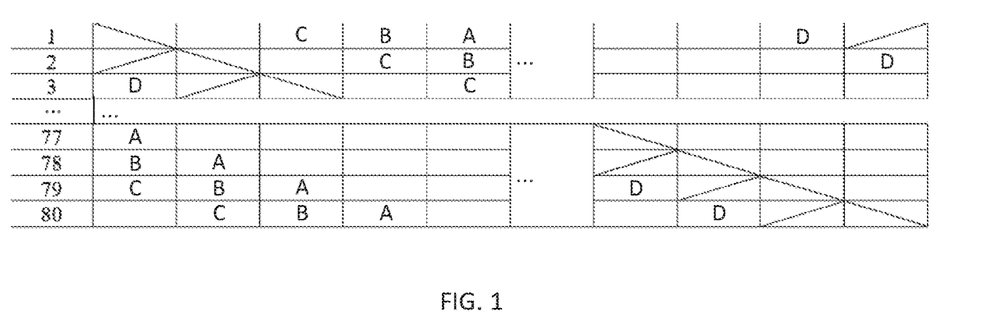
FIG. 1 is a schematic diagram of a frequency-hopping map for dividing control channels according to some embodiments of the application.

For example, the frequency-hopping map may be as shown in FIG. 1. In FIG. 1, the horizontal axis is frequency-hopping period of a physical channel, and the frequency point is the central position of the physical channel; the vertical axis is time slot. To achieve frequency-hopping gain of channel resources, time may be divided into a number of time pieces with one time piece being one block in FIG. 1, i.e., one time slot. In FIG. 1, serial numbers from 1 to 80 in the first column of blocks are used to represent numbers of control channels, and the second column of blocks represents start frequency points. FIG. 1 illustrates a physical position of a logic channel in each time slot during one frequency-hopping period. The same logic channel varies back and forth on different physical channels within one frequency-hopping period, which is hence called frequency hopping. In FIG. 1, a plurality of blocks having the same plotting mode represent one logic channel (i.e., logic channels are distinguished by control channel identifiers), while the position of a logic channel in the first time slot within a frequency-hopping period is a start frequency point. For example, all blocks having a letter "A" therein represent one logic channel, and so on; all blocks having a letter "D" therein represent another logic channel; all blocks having right slashes therein represent still another logic channel, while all blocks having left slashes therein also represent yet another logic channel, and the like. These are merely examples of data. In some embodiments, other manners may also be used to identify the same logic channel.

In some embodiments, an unmanned aerial vehicle is abbreviated as a 'UAV," which is an aircraft without carrying humans and operated by means of a radio remote control device and self-prepared program control apparatus. There is no pilot cockpit on the UAV, but devices such as autopilot, program control apparatus and the like may be installed therein. The description takes a UAV as an example of the flying device.

In some embodiments, a task may be a logistics task. For example, a flying device is used to transport one or more logistics packages from a departure station to an arrival station, and then, the task of transporting the one or more logistics packages from the departure station is a logistics task. A task may also be a monitoring task. For example, a flying device may be used to monitor devices at a departure station or an arrival station, and the like. A task may also be a photo-shooting task. For example, a flying device may be used to execute an aerial photographing task between a departure station or an arrival station, and the like. Therefore, some embodiments of the application may be applicable to any task completed by using a flying device to fly from a departure station to an arrival station.

Figure 2:
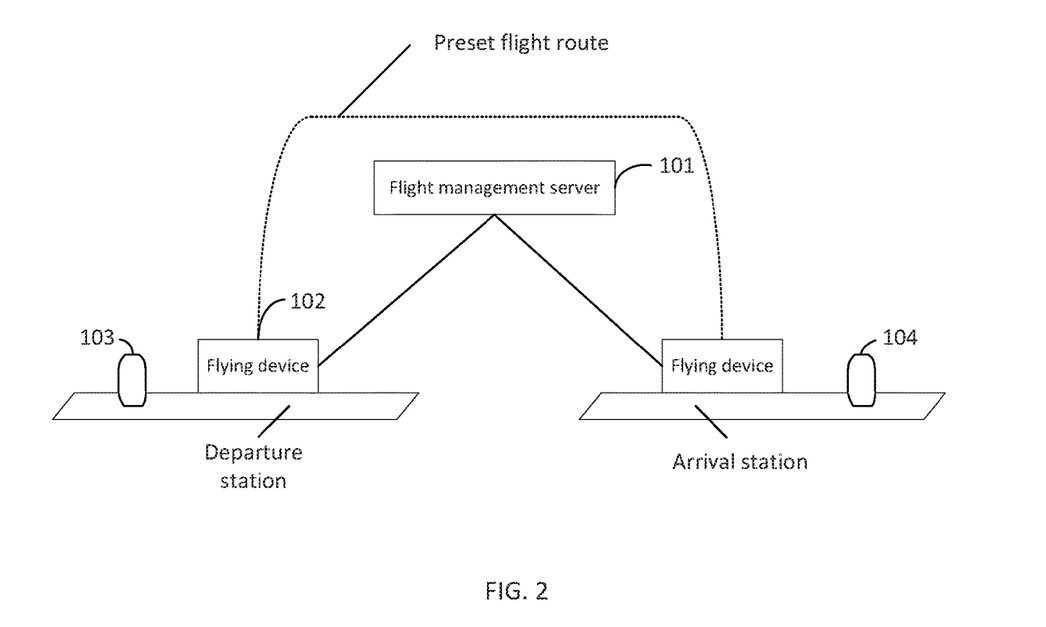
FIG. 2 is a schematic diagram of a scenario of the application according to some embodiments of the application.

FIG. 2 is a schematic diagram of a scenario of the application according to some embodiments of the application. For example, a flight management server 101 may manage all control channels that are divided in advance and a flying device 102 (e.g., a UAV) at a departure station and arrival station. Although one flying device 102, one departure station and one arrival station are shown in FIG. 2, multiple flying device 102, departure stations and arrival stations can be used in the embodiments. For example, the flight management server 101 may use the following information to control a departure station channel or an arrival station channel of a UAV: how many UAVs are available at which departure station or arrival station, and which control channel is in an idle state at which departure station or arrival station. A departure station channel of a UAV is used to represent a control channel for controlling the UAV at a departure station where the UAV takes off, while an arrival station channel thereof is used to represent a control channel for controlling the UAV at an arrival station where the UAV lands.

For ease of description, an example of a logistics task is described below. When a logistics task is generated, for example, there is a logistics package to be transported from the departure station to the arrival station in FIG. 2, the flight management server 101 may then assign a UAV this logistics task (which may be distinguished using a logistics task identifier) and allocate a departure station channel for controlling the UAV at the time of take-off and an arrival station channel for controlling the UAV at the time of landing to the UAV. In some embodiments, at each departure station or arrival station, a departure station remote control device 103 corresponding to the departure station or an arrival station remote control device 104 corresponding to the arrival station is provided. After allocating a departure station channel or an arrival station channel to the UAV, the flight management server 101 notifies the departure station remote control device 103 of a channel enabling request for the departure station channel, so that the departure station remote control device 103 may control the take-off of the UAV on the departure station channel; moreover, the flight management server 101 may send a channel enabling request for the arrival station channel to the arrival station remote control device 104, so that the arrival station remote control device 104 may control the landing of the UAV on the arrival station channel.

In addition, before taking off from the departure station, the UAV may receive a heartbeat message from the departure station remote control device 103 on the departure station channel. If the UAV can receive the message, then the UAV takes off according to a preset flight route. If the UAV cannot receive the message, the UAV does not take-off. Therefore, it can be ensured that the departure station remote control device 103 can successfully control the UAV on the departure station channel, preventing uncontrollable situations from occurring. Similarly, when approaching the arrival station to start to land, the UAV may also receive a heartbeat message sent by the arrival station remote control device 104 on the arrival station channel. If the UAV can receive the message, then the UAV starts landing. In this way, the arrival station remote control device 104 may conveniently use the arrival station channel to send control instructions to the UAV normally even in case of emergency or when a control of the UAV is required, thereby achieving the control of the UAV.

Figure 3:
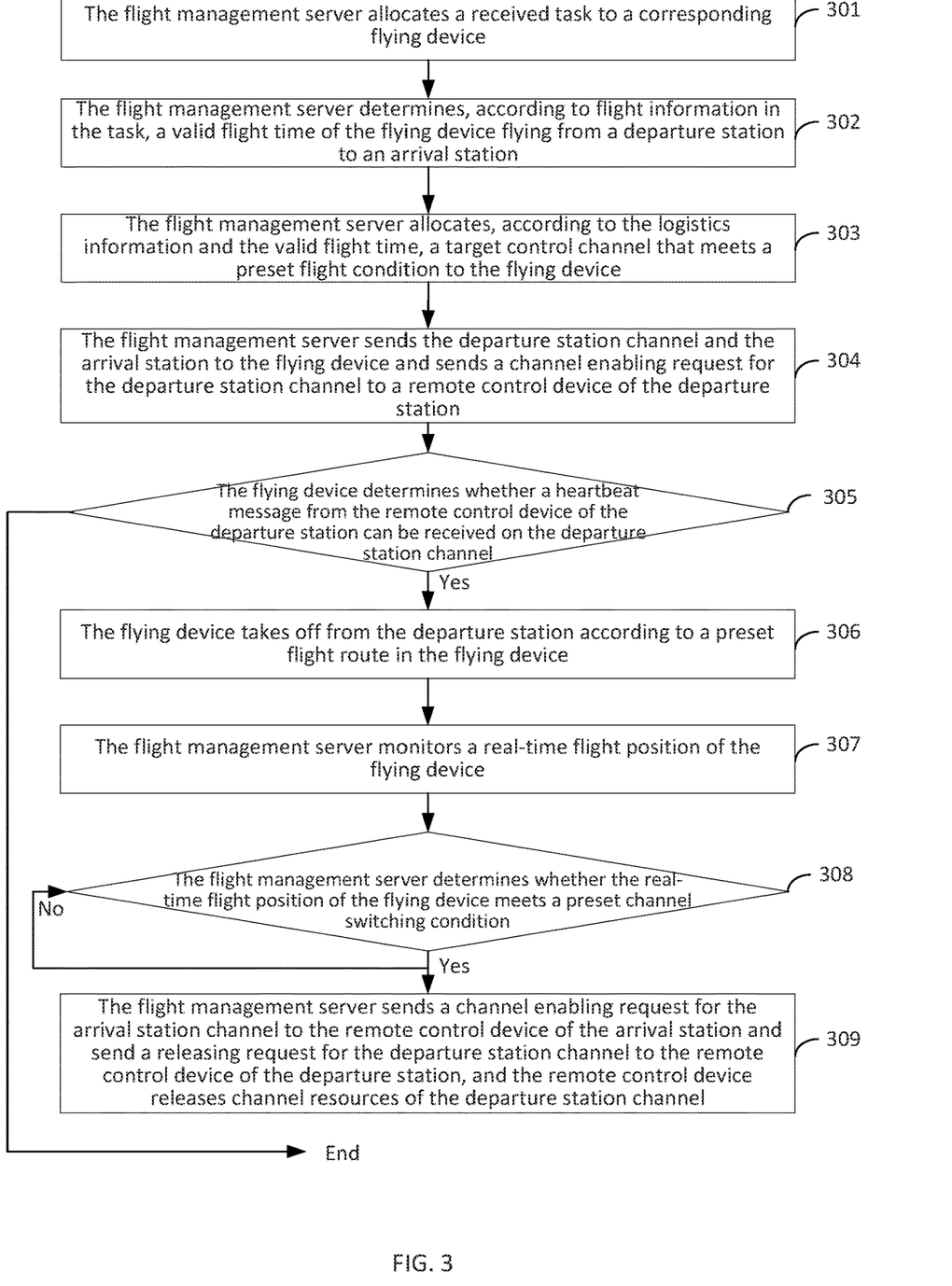
FIG. 3 is a flow chart of a method or allocating control channels for a flying device according to some embodiments of the application.

FIG. 3 is a flow chart of some embodiments of a method for allocating control channels for a flying device according to the application. The embodiments may be applied to the flight management server 101 in FIG. 2, including the following steps.

In step 301, the flight management server allocates a received task to a corresponding flying device.

In some embodiments, in a logistics task, for example, a flight management server may establish connections with all logistics stations. When the logistics stations have logistics packages to be transported, the logistics stations send logistics numbers of the logistics packages to the flight management server as logistics task identifiers for identifying the logistics packages received by the flight management server. In some embodiments, one or more pending transport tasks in one or more logistics to be transported from the same logistics station to another same logistics station may be referred to as one logistics task. For example, there are currently three logistics packages to be transported from a logistics station A to a logistics station B, and these three logistics packages may be transported by one UAV. Then, these three logistics packages may be combined into one logistics task. A logistics task identifier may be a unique serial code generated by the flight management server for the logistics task, such as 201705300114AB. This is merely an example of data. In some embodiments, the logistics station A is referred to as the departure station of the logistics task, while the logistics station B is referred to as the arrival station of the logistics task.

Upon receiving a new logistics task, the flight management server may allocate the logistics task to a UAV according to UAV specifications corresponding to the departure station identified by the logistics task. For example, there are two UAVs available at the logistics station A, i.e., UAV A and UAV B, while UAV A has a higher loading capacity and can be loaded with physical packages that are heavier than 20 KG. The total weight of the above 3 logistics packages is 21 KG. Then, UAV A may be assigned the logistics task "201705300114AB." If both UAVs are available, one may be randomly selected.

In step 302, the flight management server determines, according to flight information in the task, a flight time of the flying device flying from the departure station to the arrival station.

After the UAV is assigned, according to the flight information in the task, the flight management server may calculate, according to an average flight speed of the assigned UAV, a flight time from the departure station to the arrival station. The flight information may comprise information regarding a departure station and an arrival station. For example, the departure station is the logistics station A, and the arrival station is the logistics station B. Further, the flight information may also comprise other information related to the flight task, such as one or more intermediate stations, a target delivery time, a flight time, etc. In some embodiments, the flight time may be a time duration that meets a preset time condition in the process of the UAV flying from the departure station to the arrival station. For example, the flight time may be the entire time used by UAV A for flying from the logistics station A to the logistics station B. For example, the flight speed of UAV A is 120 km/h, and then, an expected flight time may be obtained by dividing the distance from the logistics station A to the logistics station B by the flight speed of UAV A. The flight time may also be a portion of the entire time duration that meets a preset partial time condition, e.g., a take-off time when the UAV starts take-off from the departure station, a landing time when the UAV starts landing at the arrival station, etc. Namely, the time of stable flight between the departure station and the arrival station may no longer be included in the flight time. One of ordinary skill in the art may also set some other time conditions to obtain the flight time for screening control channels of the departure station or the arrival station that are idle during the flight time.

In step 303, the flight management server allocates, according to the logistics information and the flight time, a target control channel meeting a preset control condition to the flying device.

The logistics information may comprise information of the logistics departure station and the logistics arrival station. In some embodiments, since 80 available control channels have been divided in advance, each logistics station may use these 80 control channels. To facilitate the flight management server to manage control channels of all logistics stations, the flight management server stores one or more control channel occupation tables for the logistics stations. A control channel occupation table for a logistics station may indicate states (e.g., idle, non-idle or occupied) of the 80 control channels at different time at the logistics station. For example, a control channel occupation table comprises periods of time and control channels, and also indicates whether a control channel is in an idle state in a period of time. For example, a control channel occupation table stores information of a period of time "May 15, 2017, 10:00 to May 15, 2017, 10:10" for the logistics station A, and stores that the control channel corresponding to the period of time is the control channel 1. This indicates that the control channel occupied at the logistics station A during the period of time is the control channel 1.

In some embodiments, a preset control condition to be met by the one or more target control channels may include that the target control channel is idle at both the departure station (during take-off) and the arrival station (during landing); that a target control channel is idle at either of the departure station and the arrival station, another target control channel is idle at the other one of the departure station and the arrival station; that the target control channel is idle during the entire flight time; etc.

For example, step 303 may comprise the following step A1 through step A3.

In step A1, the method may search for control channels at the departure station and the arrival station that are idle during the flight time as candidate channels.

To facilitate the control of the UAV through a control channel at both the departure station, i.e., the logistics station A, and the arrival station, i.e., the logistics station B, the flight management server may first search for control channels that are idle at both the departure station and the arrival station as candidate channels. Assuming that the flight time is the entirely occupied time that is a total of 15 minutes, the flight management server searches for control channels that are idle within 15 minutes starting from the current moment at both the logistics station A and the logistics station B. For example, the control channel 3 is among control channels of the logistics station A that are idle within the 15 minutes, while the control channel 3 is also idle at the logistics station B within the 15 minutes. Then, the control channel 3 is a candidate channel. In this way, all candidate channels may be found from the 80 control channels.

In some embodiments, assuming that the take-off time at the departure station is 2 minutes and the landing time at the arrival station is also 2 minutes, then channels at the logistics station A that are idle within 2 minutes of the take-off time and channels at the logistics station B that are idle within 2 minutes of the landing time may be searched for, respectively. The control channel may not be required to be idle within the 11 minutes of the smooth flight of the flying device.

For example, the flight management server stores one or more control channel occupation tables for all logistics stations. The flight management server may first search for control channels that are idle within the entirely occupied time, i.e., 15 minutes, in a control channel occupation table corresponding to the logistics station A, as a candidate set 1. Then, the flight management server may search for control channels that are idle within the 15 minutes in a control channel occupation table corresponding to the logistics station B as a candidate set 2. Subsequently, the flight management server may find the intersection of the candidate sets 1 and 2 to obtain candidate channels that are idle at both the logistics station A and the logistics station B.

In step A2, the method may select, from the candidate channels, a channel having the longest distance from all channels in use as a target channel for controlling the flying device at the departure station and the arrival station.

To further avoid interference among channels, in some embodiments, a candidate channel with relatively long distance from channels in use may be selected as the ultimately determined target channel. In some embodiments, the channels in use may comprise control channels in a non-idle state corresponding to at least the departure station or the arrival station during the flight time. A channel in use may also referred to as an occupied channel or a non-idle channel at either of the departure or arrival station. For example, when searching for a channel having the longest distance from all channels in use, a difference between channel identifiers of each candidate channel and each channel in use may be calculated, respectively, and then a candidate channel having a maximum absolute value of difference among the differences each between the channel identifiers of a respective candidate channel and a respective channel in use is determined as a target channel for controlling the flying device.

For example, there are three candidate channels, i.e., candidate channel 6, candidate channel 10, and candidate channel 15, while the channels in use include control channel 25, control channel 61, and control channel 76, then the channel identifiers of the control channels 25, 61, and 76 are deducted from the identifier numbers of the candidate channels, respectively. For the control channel 6, the differences with the channels in use, −19, −55 and −70 are obtained, respectively. For the control channel 10, the differences with the channels in use, −15, −51 and −66 are obtained, respectively. For the control channel 15, the differences with the channels in use, −10, −46 and −61 are obtained, respectively. The difference between the control channel 6 and the channel in use 76, i.e., −70, has the maximum absolute value. Therefore, the control channel 6 may be used as a target channel for controlling the flying device at the departure station and the arrival station.

In some embodiments, it is likely that no control channel is idle at both the departure station and the arrival station. Instead, there are control channels that are idle at the departure station or idle at the arrival station. Therefore, it may be further determined, after the step A1 but before the step A2, whether the searching for the candidate channels, i.e., idle control channels at both the departure station and the arrival station, is successful; when the search is successful, i.e., at least one control channel has been found that is idle at both the departure station and the arrival station, the step A2 is executed; if the search is not successful, i.e., no control channel idle at both the departure station and the arrival station has been successfully found, the step A3 is executed.

In step A3, the method may query an idle control channel in the control channel occupation table corresponding to the departure station as a departure station channel for controlling the flying device at the departure station; and query an idle control channel in the control channel occupation table corresponding to the arrival station as an arrival station channel for controlling the flying device at the arrival station.

In this step, since there is no control channel that is idle at both the departure station and the arrival station, a control channel that is idle at the departure station may be queried as the departure station channel, and a control channel that is idle at the arrival station may be queried as the arrival station channel. In some embodiments, when a flying device takes off at the departure station, the departure station channel is used to receive a heartbeat message sent by a remote control device of the departure station; when landing at the arrival station, the flying device may switch to a arrival station channel, and receive a heartbeat message from a remote control device of the arrival station on the arrival station channel.

For example, the idle channel at the departure station is the control channel 5, and the idle channels at the arrival station are the control channels 15 and 27. Then, [the control channel 5, the control channel 15] may be used as a candidate channel pair 1, where the departure station channel is the control channel 5, and the arrival station channel is the control channel 15; alternatively, [the control channel 5, the control channel 27] may also be used as a candidate channel pair 2, where the departure station channel is the control channel 5, and the arrival station channel is the control channel 27.

After the step 303 is executed, one or more target control channels capable of controlling the flying device at either or both the departure station and the arrival station may be obtained, and then the flight management server sends the one or more target control channels to the flying device. If the target control channels are the same control channel at both the departure station and the arrival station, then one channel identifier (i.e., the channel identifier of the same target control channel at both the departure station and the arrival station) may be sent. If the departure station channel and the arrival station channel are different, however, the flight management server may send channel identifiers of both the departure station channel and the arrival station channel to the flying device.

In some embodiments, an example of the departure station channel and the arrival station channel being different control channels is described below, in which step 304 is executed.

In step 304, the flight management server sends the departure station channel and the arrival station channel to the flying device and sends a channel enabling request for the departure station channel to a remote control device of the departure station.

The flight management server sends channel identifiers of both the departure station channel and the arrival station channel to the flying device. Upon receiving these two channel identifiers, the flying device first receives a heartbeat message from a remote control device of the departure station on the control channel indicated by the channel identifier of the departure station channel. In some embodiments, the flight management server may also send a channel enabling request for the departure station channel to a remote control device of the departure station, where the channel enabling request may comprise: a flying device identifier, a logistics task identifier, the channel identifier of the departure station channel, and a duration. The remote control device of the departure station then may send one or more heartbeat messages to the flying device corresponding to the flying device identifier on the departure station channel in the duration.

In step 305, the flying device determines whether a heartbeat message from the remote control device of the departure station can be received on the departure station channel; if so, proceeds to step 306.

When taking off from the departure station, the flying device first checks whether the channel identifier of the departure station channel and the channel identifier of the arrival station channel transmitted by the flight management server are received; if so, the flying device monitors and receives a heartbeat message from the remote control device of the departure station on a control channel corresponding to the channel identifier of the departure station channel.

In step 306, the flying device takes off from the departure station according to a preset flight route in the flying device.

Since the remote control device of the departure station can perform control on the flying device when the remote control device of the departure station and the flying device simultaneously operate on the same control channel, the flying device may take off from the departure station according to a preset flight route if the flying device can receive the heartbeat message from the remote control device of the departure station.

In some embodiments, a fog light, such as a red and green double flash fog light, may be configured on the flying device in advance, so that ground staff can more clearly identify the flying device when the flying device is under auxiliary control by the remote control device. Once the heartbeat message from the remote control device of the departure station is received, the double flash fog light may be configured to flash, and when no heartbeat message is received, the double flash fog light is configured to stop flashing. One of ordinary skill in the art may also use other manners having other significant identification features for identifying whether a heartbeat message is received.

In step 307, after the flying device takes off, the flight management server monitors a real-time flight position of the flying device.

During a flight of the flying device, a real-time flight position is synchronized with the flight management server. For example, the flying device may synchronize a change of the actual distance from the departure station or indication whether a waypoint is reached with the flight management server, to facilitate the flight management server to monitor the flying device during the entire process from the departure station to the arrival station.

In step 308, the flight management server determines whether the real-time flight position of the flying device meets a preset channel switching condition; if so, the method proceeds to step 309.

The flight management server may set some channel switching conditions in advance, and the channel switching conditions are used to indicate that the flying device is about to land at the arrival station. When the flying device is landing at the arrival station, if the departure station channel and the arrival station channel are not the same control channel, a channel enabling request for the arrival station channel may be sent to a remote control device of the arrival station. If the departure station channel and the arrival station channel are the same control channel, the step 308 may not be executed.

In some embodiments, according to a received real-time flight position synchronized by the flying device, the flight management server may determine, in real time, whether the flying device has completed one half of the range from the departure station to the arrival station, or whether the flying device has arrived at the first waypoint before the arrival station, and the like. If any one or more of these channel switching conditions set in advance are met, step 309 is executed.

In step 309, the flight management server sends a channel enabling request for the arrival station channel to the remote control device of the arrival station and sends to the remote control device of the departure station a channel releasing request for the departure station channel, so as to release channel resources of the departure station channel at the remote control device of the departure station, and the remote control device of the departure station releases channel resources of the departure station channel.

When the flying device enters an area close to the arrival station and begins an accurate landing, the flying device may land normally if the flying device has flown normally on the flight route to the arrival station. In some embodiments, it is possible that multiple flying devices are to land at the arrival station at the same time, in which situation the landing procedure may be directly executed if the flying devices have flown normally to the arrival station. The remote control device of the arrival station can send a heartbeat message on one arrival station channel at the same time. Therefore, if there are multiple flying devices are to land at the same time, the remote control device of the arrival station may control the flying device in an abnormal state to land, while other flying devices that have not shown an abnormal state may directly and normally land.

Assuming that flying devices A, B and C simultaneously enter an area close to the arrival station, the remote control device of the arrival station may obtain arrival station channels corresponding to these three flying devices A, B and C, respectively, from enabling requests for the arrival station channels of these three flying devices. The remote control device of the arrival station may operate on any arrival station channel at the same time, namely, may send a heartbeat message on any arrival station channel to control the flying device corresponding to the arrival station channel. The enabling request for the arrival station channel may also comprise: a flying device identifier, a logistics task identifier, and an arrival station channel. In addition, the flight management server may also change a non-idle state of the departure station channel to an idle state in the stored control channel occupation table of the departure station, and release channel resources of the departure station channel.

When flying devices A, B and C start landing, assuming that an operator visually observes that the flying device C is in an abnormal state, the operator may quickly switch the remote control device of the arrival station to the arrival station channel C and complete manual control of the landing process of the flying device C. In some embodiments, however, there is one flying device to land at a time in most of the situations, and thus the remote control device of the arrival station can operate on an arrival station channel corresponding to this flying device.

Some channel switching conditions may also be set in advance with respect to a flying device. For example, when the distance from the departure station is at or more than a preset distance threshold (e.g., 2 kilometers and the like) or no heartbeat message has been received from the remote control device of the arrival station for a duration threshold (e.g., 1 minute and the like), then the flying device may re-set a control channel for receiving a heartbeat message, or automatically switch to the arrival station channel for receiving a heartbeat message from the remote control device of the arrival station.

Figure 4:
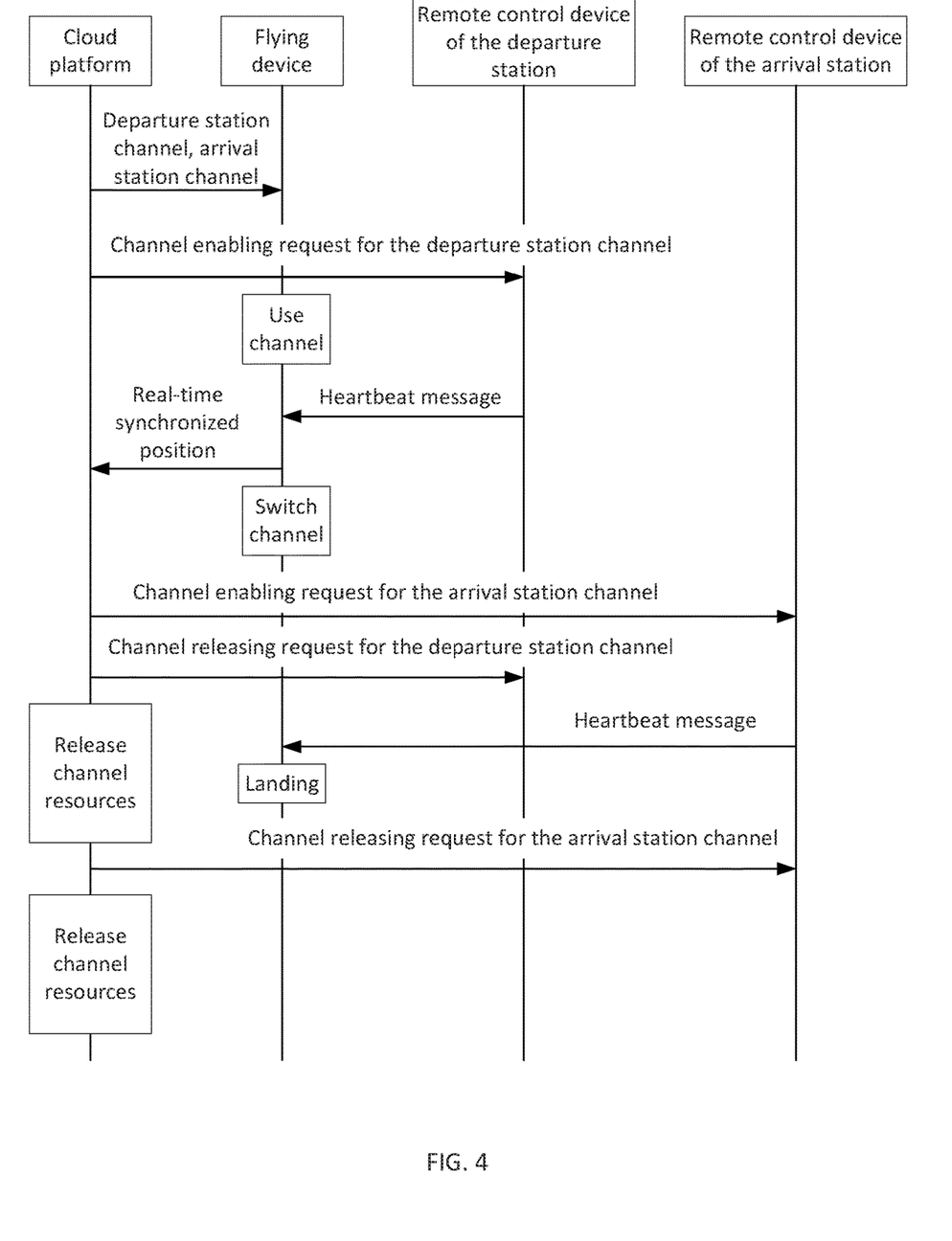
FIG. 4 is a schematic diagram of signaling interaction according to some embodiments of the application.

For example, FIG. 4 is a schematic diagram of signaling interaction among a flight management server, a flying device, a departure station, and an arrival station. In FIG. 4, after the control channels are successfully allocated, the flight management server sends both the departure station channel and the arrival station channel to the flying device, and sends to the remote control device of the departure station a channel enabling request for the departure station channel (which may comprise a departure station channel identifier, a flying device identifier, and the like). The flying device uses the departure station channel to receive a heartbeat message sent from the remote control device of the departure station and takes off. In the take-off process of the flying device, the flying device synchronizes, in real time, flight position information with the flight management server, and when a preset channel switching condition is met, the flying device switches to the arrival station channel for receiving a heartbeat message sent by the remote control device of the arrival station.

When the preset channel switching condition is met, the flight management server sends a channel enabling request for the arrival station channel to the remote control device of the arrival station and sends to the remote control device of the departure station a channel releasing request for the departure station channel. In addition, the flight management server releases channel resources of the departure station channel. Subsequently, the remote control device of the arrival station sends a heartbeat message on the arrival station channel to the flying device that is in an abnormal state, and upon receiving the heartbeat message on the arrival station channel, the flying device in an abnormal state lands at the departure station; flying devices in normal states may land on their own at the arrival station. In addition, the flight management server releases channel resources of the arrival station channel.

In some embodiments, each departure station or arrival station is equipped with one remote control device. Therefore, if a plurality of UAVs at a departure station is taking off or if a plurality of UAVs are landing at an arrival station at the same time or at times close to one another, a channel selection knob may be provided on a corresponding remote control device. For example, FIG. 5 may be referenced for a control interface of a remote control device.

Figure 5:
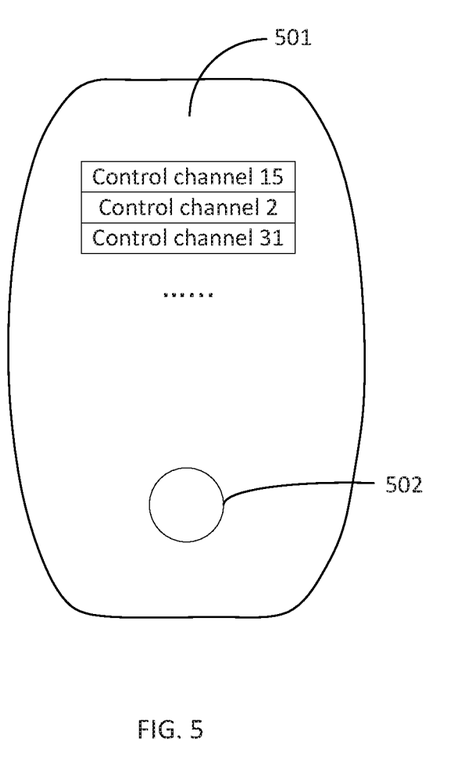
FIG. 5 is a schematic diagram of a control interface of a remote control device according to some embodiments of the application.

In FIG. 5, assuming that the remote control device is a remote control device of the arrival station, the remote control device may be provided with an active channel display screen 501 and a channel selection knob 502. The active channel display screen 501 is configured to display all arrival station channels in the enabling requests received by the remote control device of the arrival station sequentially from the top to the bottom according to a sequential order of receiving times. For example, in FIG. 5, the very first arrival station channel received by the remote control device of the arrival station is control channel 15, the last arrival station channel received is control channel 31, and there is a total of 3 active channels at that moment. Logistics task identifiers, flying device identifiers, departure stations, arrival stations, and the like may also be displayed along with control channel identifiers on the active channel display screen to facilitate operators to identify and select channels.

Control channels that are the most recently received by the remote control device of the arrival station may be simply displayed sequentially in a list below the control channel 31. An operator may select an active channel corresponding to the flying device in an abnormal state by rotating the channel selection knob 502. After the selection is made, the remote control device immediately uses selected active channel to send a heartbeat message carrying the flying device identifier and the logistics task identifier to the flying device. In some embodiments, if the display content of the active channel display screen 501 is empty, the latest displayed active channel is selected by default.

Additionally, the flight management server may further send to the remote control device of the departure station a releasing request for the departure station channel, and the releasing request may comprise a departure station channel identifier, a logistics task identifier, and a flying device identifier. Upon receiving the releasing request, the remote control device of the departure station may delete the column of active channel display corresponding to the departure station channel. The remote control device and the flight management server may establish a long link via a WI-FI network of logistics stations or a mobile communication network, and receive the above-described control channel enabling request and control channel releasing request via the long link.

Therefore, in some embodiments, the flight management server is used to manage, in a unified manner, a plurality of control channels that are divided in advance. Each control channel comprises: communication sub-channels and a frequency-hopping map cyclically set according to a preset channel interval. After allocating a received logistics task to a corresponding flying device, the flight management server calculates a flight time of the flying device flying from the departure station to the arrival station, allocates a control channel that is idle at both the departure station and the arrival station during the flight time to the flying device for performing auxiliary control on the flying device during take-off or landing. In this way, there is no need to perform one-to-one bundling control between remote control device devices and flying devices. It may be just necessary to control the flying device during take-off and landing, respectively, using a control channel pre-allocated by the flight management server. After the control is completed, channel resources of this control channel can be released.

Therefore, in some embodiments, a plurality of UAVs may be controlled, respectively, by using one remote control device at each logistics station. Namely, no one-to-one control is performed between UAVs and remote control device devices; additionally, some embodiments of the application can further ensure that, when a plurality of UAVs take off or land at the same time, a remote control device may control one of the UAVs based on needs and may rapidly switch between a plurality of control channels corresponding to the plurality of UAVs, thereby improving the frequency spectrum utilization efficiency of the remote control device and reducing reception interference among the UAVs. In addition, some embodiments of the application may further provide a remote control device signal indicator on an UAV to help an operating user determine whether the UAV to be controlled is connected.

For ease of description, the above-described method embodiments are all described as a series of action combinations. However, one of ordinary skill in the art should be aware that the application is not limited by the described orders of actions. According to the application, some steps may be used in other orders or simultaneously. Secondly, one of ordinary skill in the art should also be aware that the embodiments described in the specification are some embodiments, and the involved actions and modules are not necessarily required by the application.

Figure 6:
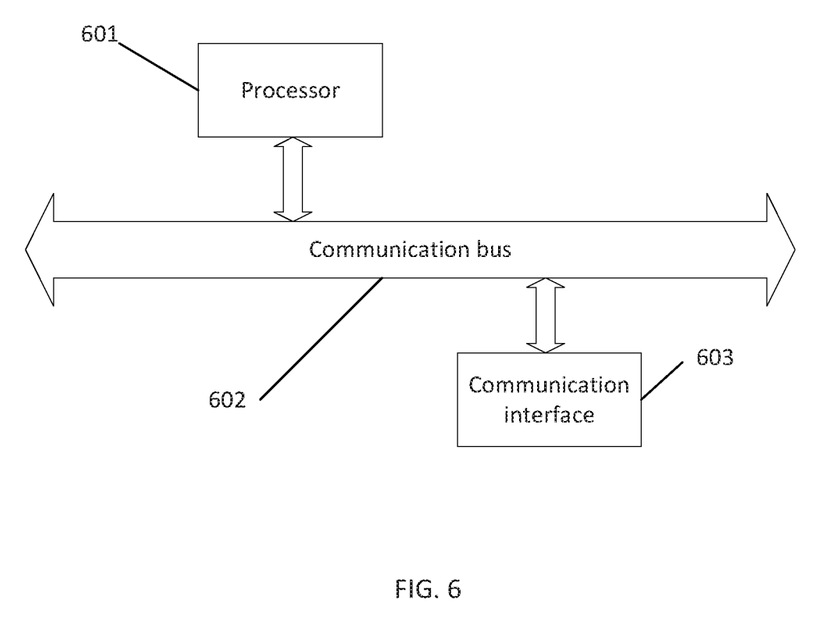
FIG. 6 is a schematic structural diagram of a flight management server according to some embodiments of the application.

Referring to FIG. 6, the application further provides embodiments of a flight management server. In some embodiments, the flight management server may comprise: a processor 601, configured to allocate a received task to a corresponding flying device; determine, according to flight information in the task, an effective time of the flying device flying from a departure station to an arrival station; and allocate, according to logistics information and flight time, a target control channel meeting a preset control condition to the flying device; and a communication interface 603 connected to the processor 601 via a communication bus 602 and configured to notify the flying device of the target control channel.

In some embodiments, the processor 601 being configured to allocate, according to logistics information and flight time, a target control channel meeting a preset control condition to the flying device may, for example, comprise: searching for idle control channels at the departure station and the arrival station that are idle during the flight time as candidate channels; and selecting, from the candidate channels, a channel having the longest distance from all channels in use as a target channel for controlling the flying device at the departure station and the arrival station; the channels in use comprise control channels at least having a corresponding non-idle state at the departure station or the arrival station during the flight time.

In some embodiments, a plurality of control channels respectively correspond to a plurality of channel identifiers; the processor 601 being configured to select, from the candidate channels, a channel having the longest distance from all channels in use as a target channel for controlling the flying device may, for example, comprise: respectively calculating an absolute value of a difference between channel identifiers of each candidate channel and each channel in use; and determining a candidate channel corresponding to a difference having a maximum absolute value as a target channel for controlling the flying device.

In some embodiments, the processor 601 may be further configured to pre-store a control channel occupation table for each departure station or arrival station, and the control channel occupation table is used for storing idle states of control channels at the departure station or the arrival station during each period of time; and the processor being configured to search for idle control channels at the departure station and the arrival station that are idle during the flight time as candidate channels may, for example, comprise: querying control channels that are idle during the flight time in the control channel occupation tables for the departure station and the arrival station respectively as the candidate channels.

In some embodiments, the processor 601 may be further configured to: determine the candidate channels have been successfully queried; if so, execute the selecting, from the candidate channels, a channel having the longest distance from all channels in use; and if not, search for an idle control channel in the control channel occupation table corresponding to the departure station as a departure station channel for controlling the flying device at the departure station; and search for an idle control channel in the control channel occupation table corresponding to the arrival station as an arrival station channel for controlling the flying device at the arrival station.

In some embodiments, the processor 601 may be further configured to: send the departure station channel and the arrival station channel to the flying device, and send a channel enabling request for the departure station channel to a remote control device of the departure station.

In some embodiments, the processor 601 may be further configured to: monitor, after the flying device takes off, a real-time flight position of the flying device; and determine whether the real-time flight position of the flying device meets a preset channel switching condition; if so, send a channel enabling request for the arrival station channel to a remote control device of the arrival station.

In some embodiments, the processor 601 is further configured to: send to the remote control device of the departure station a channel releasing request for the departure station channel, and release channel resources occupied by the departure station channel.

Therefore, in some embodiments, the flight management server may manage, in a unified manner, a plurality of control channels that are divided in advance. Each control channel comprises: communication sub-channels and a frequency-hopping map cyclically set according to a preset channel interval. After allocating a received logistics task to a corresponding flying device, the flight management server calculates a flight time of the flying device flying from the departure station to the arrival station, allocates a control channel that is idle at both the departure station and the arrival station during the flight time to the flying device for performing auxiliary control on the flying device during take-off or landing. In this way, there is no need to perform one-to-one bundling control between remote control device devices and flying devices. It may be just necessary to control the flying device during take-off and landing, respectively, using a control channel pre-allocated by the flight management server. After the control is completed, channel resources of this control channel are released.

Some embodiments of the present specification further provide an embodiment of a flying device. In some embodiments, the flying device may comprise: a communication interface, configured to receive a target control channel sent by a flight management server; and a processor, configured to determine whether a heartbeat message from a remote control device of a departure station can be received on the target control channel; if so, take off from the departure station according to a preset flight route in the flying device.

In some embodiments, the processor may be further configured to: synchronize, during a flight of the flying device, a real-time flight position with the flight management server.

In some embodiments, the target control channel may, for example, comprise: a departure station channel as a control channel for the departure station and an arrival station channel as a control channel for an arrival station, and the processor may be further configured to: determine whether the heartbeat message has not been received on the departure station channel after a preset time, or whether a distance from the departure station exceeds a preset distance threshold; if so, receive, on the arrival station channel, a heartbeat message sent by a remote control device of the arrival station.

Figure 7:
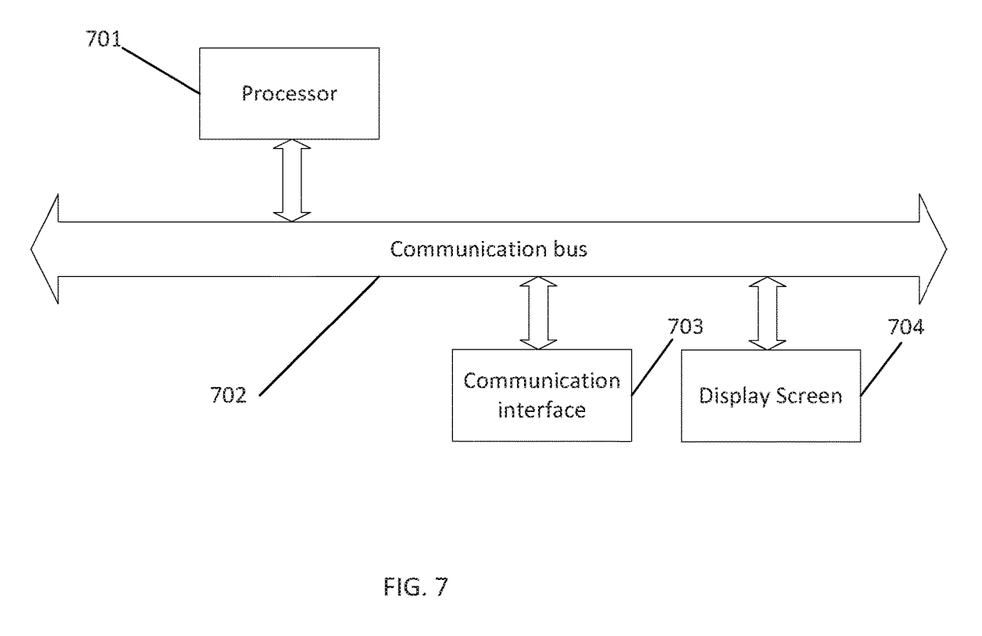
FIG. 7 is a schematic structural diagram of a remote control device according to some embodiments of the application.

Referring to FIG. 7, some embodiments of the application further provide an embodiment of a take-off remote control device. In some embodiments, the take-off remote control device may comprise: a processor 701, configured to obtain a departure station channel and a flying device identifier from a channel enabling request for the departure station channel sent by a flight management server; a communication interface 703 connected to the processor 701 via a communication bus 702 and configured to use the departure station channel to send a heartbeat message to a flying device corresponding to the flying device identifier, for the flying device, upon receiving the heartbeat message, to take off from the departure station according to a preset flight route; and a display screen 704 connected to the processor 701 and the communication interface 703 via the communication bus 702 and configured to display a departure station channel.

In some embodiments, the processor 701 may be further configured to release the departure station channel upon receiving a releasing request for the departure station channel sent by the flight management server.

Some embodiments of the application further provide an embodiment of a landing remote control device. In some embodiments, the landing remote control device may, for example, comprise: a communication interface, configured to receive an enabling request for an arrival station channel sent by a flight management server; a processor connected to the communication interface via a communication bus and configured to obtain an arrival station channel and a flying device identifier carried in the enabling request for the arrival station channel; and if any one of flying devices is in an abnormal state, send a heartbeat message on an arrival station channel corresponding to the abnormal flying device, so as to control a landing process of the abnormal flying device; and a display screen connected to the communication interface and the processor via the communication bus and configured to display a departure station channel.

In some embodiments, the processor may be further configured to: release the arrival station channel upon receiving a releasing request for the arrival station channel sent by a flight management server.

With regard to the remote control device in some embodiments of the application, a plurality of UAVs may be controlled, respectively, by using one remote control device at each logistics station. Namely, no one-to-one control is performed between UAVs and remote control device devices; additionally, some embodiments of the application can further ensure that, when a plurality of UAVs take off or land at the same time, a remote control device may control one of the UAVs based on needs and may rapidly switch between a plurality of control channels corresponding to the plurality of UAVs, thereby improving the frequency spectrum utilization efficiency of the remote control device and reducing reception interference among the UAVs. In addition, some embodiments of the application may further provide a remote control device signal indicator on an UAV to help an operating user determine whether the UAV to be controlled is connected.

It should be noted that the embodiments of the present specification are described in a progressive manner. Each embodiment is focused on parts different from other embodiments, and the embodiments may be mutually referenced for identical or similar parts. Since the device embodiments are substantially similar to the method embodiments, the device embodiments are described briefly, and the description of relevant parts of the method embodiments can be referenced.

Finally, it should be further noted that relational terms such as first and second in this specification are used to differentiate one entity or operation from another entity or operation, and do not necessarily require or imply any of such relations or orders between these entities or operations. Moreover, the terms of "including," "comprising," or any other variants of the terms are intended to encompass a non-exclusive inclusion, causing a process, method, commodity, or device comprising a series of elements to not only comprise these elements, but also comprise other elements that are not explicitly listed, or further comprise elements that are inherent to the process, method, commodity, or device. When there is no further restriction, elements defined by the statement "comprising one . . . " do not exclude that a process, method, commodity, or device comprising the above elements further comprises additional identical elements.

The control channel allocation method, the take-off method, and the remote control device methods for a flying device according to the application are described above in detail. Examples are used in this specification to describe the principles and implementation manners of the application. The description of the above embodiments is intended merely to help understand the methods and core concepts of the application. At the same time, one of ordinary skill in the art may make changes to implementation manners and the application scope according to the concept of the application. In summary, the content of the present specification shall not be construed as limitations to the application.

What is claimed is:

1. A control channel allocation method for a flying device, the method comprising:
   allocating a task to a flying device, wherein the task comprises flight information for the flying device;
   determining a flight time of the flying device flying from a departure station to an arrival station according to the flight information;
   searching for one or more control channels at the departure station and the arrival station that are idle during the flight time based on one or more control channel occupation tables as one or more target control channels, wherein the one or more control channel occupation tables store idle states of a plurality of control channels at the departure station and the arrival station during a plurality of periods of time, wherein the searching comprises:

determining whether the one or more control channels at the departure station and the arrival station that are idle during the flight time are present;

in response to determining that the one or more control channels at the departure station and the arrival station that are idle during the flight are present, selecting, from the one or more control channels, a channel having the longest distance from a channel in use as a target channel for controlling the flying device at the departure station and the arrival station; and in response to determining that no control channel that is idle at the departure station and the arrival station during the flight time is present, querying an idle control channel in a control channel occupation table corresponding to the departure station as a departure station channel for controlling the flying device at the departure station, and querying an idle control channel in a control channel occupation table corresponding to the arrival station as an arrival station channel for controlling the flying device at the arrival station; and allocating the one or more target control channels for controlling the flying device to fly from the departure station to the arrival station.

2. The method according to claim 1, wherein the flight time comprises an entire time of the flying device flying from a departure station to an arrival station, a take-off time of the flying device flying from a departure station to an arrival station, or a landing time of the flying device flying from a departure station to an arrival station.

3. The method according to claim 1, wherein a plurality of control channels respectively correspond to a plurality of channel identifiers; and wherein selecting, from the one or more control channels, a channel having the longest distance from a channel in use as a target channel for controlling the flying device at the departure station and the arrival station comprises:

respectively calculating an absolute value of a difference between channel identifiers of each of the one or more control channels and each channel in use; and determining a control channel corresponding to a difference having a maximum absolute value as the target channel for controlling the flying device.

4. The method according to claim 1, further comprising: notifying the flying device of the departure station channel and the arrival station channel; and sending a channel enabling request for the departure station channel to a remote control device of the departure station.

5. The method according to claim 4, further comprising: monitoring, after the flying device takes off, a real-time flight position of the flying device;

determining whether the real-time flight position of the flying device meets a channel switching condition; and in response to determining that the real-time flight position of the flying device meets a preset channel switching condition, sending a channel enabling request for the arrival station channel to a remote control device of the arrival station.

6. The method according to claim 5, wherein the channel switching condition indicates that the flying device is about to land at the arrival station.

7. The method according to claim 5, further comprising:
  sending to the remote control device of the departure station a channel releasing request for the departure station channel, causing the remote control device to release channel resources occupied by the departure station channel.

8. A flight management server, comprising: one or more processors and one or more non-transitory computer-readable memories coupled to the one or more processors and configured with instructions executable by the one or more processors to cause the server to perform operations comprising:

allocating a task to a flying device, wherein the task comprises flight information for the flying device;

determining a flight time of the flying device flying from a departure station to an arrival station according to the flight information;

searching for one or more control channels at the departure station and the arrival station that are idle during the flight time based on one or more control channel occupation tables as one or more target control channels, wherein the one or more control channel occupation tables store idle states of a plurality of control channels at the departure station and the arrival station during a plurality of periods of time, wherein the searching comprises:

determining whether the one or more control channels at the departure station and the arrival station that are idle during the flight time are present;

in response to determining that the one or more control channels at the departure station and the arrival station that are idle during the flight are present, selecting, from the one or more control channels, a channel having the longest distance from a channel in use as a target channel for controlling the flying device at the departure station and the arrival station; and in response to determining that no control channel that is idle at the departure station and the arrival station during the flight time is present, querying an idle control channel in a control channel occupation table corresponding to the departure station as a departure station channel for controlling the flying device at the departure station, and querying an idle control channel in a control channel occupation table corresponding to the arrival station as an arrival station channel for controlling the flying device at the arrival station; and allocating the one or more target control channels for controlling the flying device to fly from the departure station to the arrival station.

9. The server according to claim 8, wherein the flight time comprises an entire time of the flying device flying from a departure station to an arrival station, a take-off time of the flying device flying from a departure station to an arrival station, or a landing time of the flying device flying from a departure station to an arrival station.

10. The server according to claim 8, wherein a plurality of control channels respectively correspond to a plurality of channel identifiers; and wherein selecting, from the one or more control channels, a channel having the longest distance from a channel in use as a target channel for controlling the flying device at the departure station and the arrival station comprises:

respectively calculating an absolute value of a difference between channel identifiers of each of the one or more control channels and each channel in use; and determining a control channel corresponding to a difference having a maximum absolute value as the target channel for controlling the flying device.

11. The server according to claim 8, further comprising:
notifying the flying device of the departure station channel and the arrival station channel; and sending a channel enabling request for the departure station channel to a remote control device of the departure station.

12. The server according to claim 11, further comprising:
monitoring, after the flying device takes off, a real-time flight position of the flying device;

determining whether the real-time flight position of the flying device meets a channel switching condition; and in response to determining that the real-time flight position of the flying device meets a preset channel switching condition, sending a channel enabling request for the arrival station channel to a remote control device of the arrival station.

13. The server according to claim 12, wherein the channel switching condition indicates that the flying device is about to land at the arrival station.

14. A non-transitory computer-readable storage medium configured with instructions executable by one or more processors to cause the one or more processors to perform operations comprising:

allocating a task to a flying device, wherein the task comprises flight information for the flying device;

determining a flight time of the flying device flying from a departure station to an arrival station according to the flight information;

searching for one or more control channels at the departure station and the arrival station that are idle during the flight time based on one or more control channel occupation tables as one or more target control channels, wherein the one or more control channel occupation tables store idle states of a plurality of control channels at the departure station and the arrival station during a plurality of periods of time, wherein the searching comprises:

determining whether the one or more control channels at the departure station and the arrival station that are idle during the flight time are present;

in response to determining that the one or more control channels at the departure station and the arrival station that are idle during the flight are present, selecting, from the one or more control channels, a channel having the longest distance from a channel in use as a target channel for controlling the flying device at the departure station and the arrival station; and in response to determining that no control channel that is idle at the departure station and the arrival station during the flight time is present, querying an idle control channel in a control channel occupation table corresponding to the departure station as a departure station channel for controlling the flying device at the departure station, and querying an idle control channel in a control channel occupation table corresponding to the arrival station as an arrival station channel for controlling the flying device at the arrival station; and allocating the one or more target control channels for controlling the flying device to fly from the departure station to the arrival station.

15. The non-transitory computer-readable storage medium of claim 14, wherein the flight time comprises an entire time of the flying device flying from a departure station to an arrival station, a take-off time of the flying device flying from a departure station to an arrival station, or a landing time of the flying device flying from a departure station to an arrival station.

16. The non-transitory computer-readable storage medium of claim 14, wherein a plurality of control channels respectively correspond to a plurality of channel identifiers; and wherein selecting, from the one or more control channels, a channel having the longest distance from a channel in use as a target channel for controlling the flying device at the departure station and the arrival station comprises:

respectively calculating an absolute value of a difference between channel identifiers of each of the one or more control channels and each channel in use; and determining a control channel corresponding to a difference having a maximum absolute value as the target channel for controlling the flying device.

17. The non-transitory computer-readable storage medium of claim 14, wherein the operations further comprise:

monitoring, after the flying device takes off, a real-time flight position of the flying device;

determining whether the real-time flight position of the flying device meets a channel switching condition; and in response to determining that the real-time flight position of the flying device meets a preset channel switching condition, sending a channel enabling request for the arrival station channel to a remote control device of the arrival station.

* * * * *